April 20, 1954   J. H. WILSON   2,675,897
AIR CONTROL SYSTEM
Filed June 25, 1948   5 Sheets-Sheet 1

INVENTOR.
John Hart Wilson
BY
Wayland D. Keith
HIS AGENT.

April 20, 1954 J. H. WILSON 2,675,897
AIR CONTROL SYSTEM
Filed June 25, 1948 5 Sheets-Sheet 3

INVENTOR.
John Hart Wilson
BY
Wayland D. Keith
HIS AGENT.

April 20, 1954 J. H. WILSON 2,675,897
AIR CONTROL SYSTEM
Filed June 25, 1948 5 Sheets-Sheet 4

INVENTOR.
John Hart Wilson
BY
Wayland D Keith
HIS AGENT.

April 20, 1954  J. H. WILSON  2,675,897
AIR CONTROL SYSTEM
Filed June 25, 1948  5 Sheets-Sheet 5
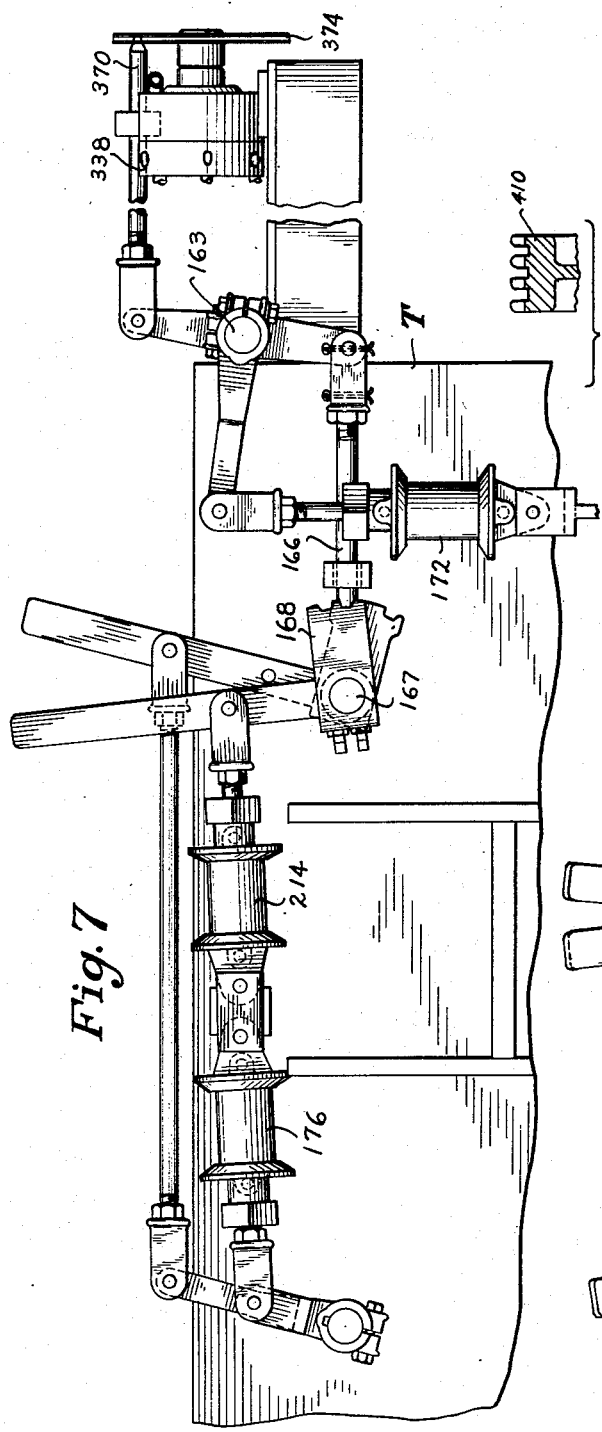
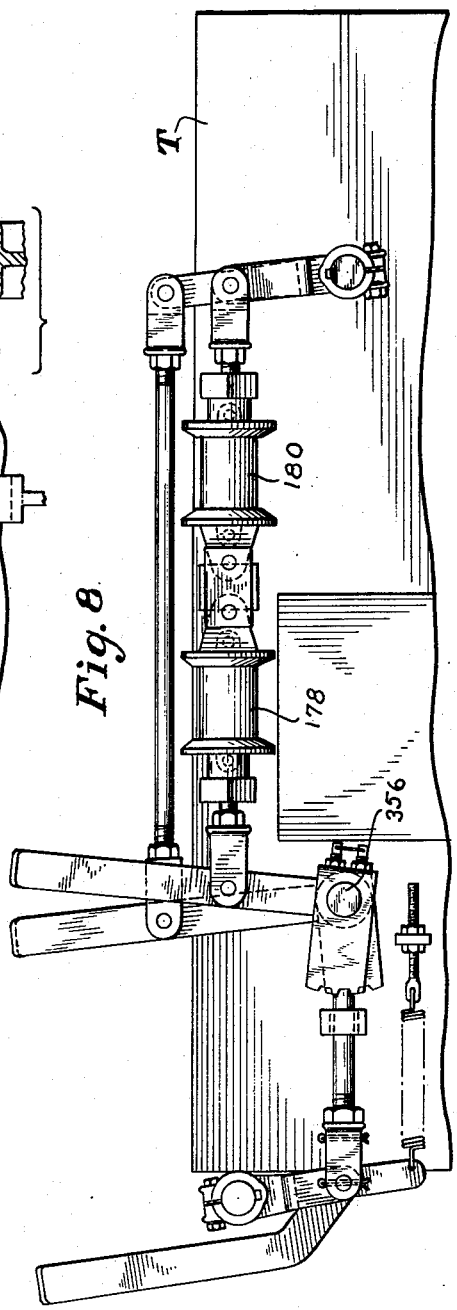
INVENTOR.
John Hart Wilson
BY
Wayland D Keith
HIS AGENT.

Patented Apr. 20, 1954

2,675,897

UNITED STATES PATENT OFFICE 2,675,897

AIR CONTROL SYSTEM

John Hart Wilson, Wichita Falls, Tex.

Application June 25, 1948, Serial No. 35,238

13 Claims. (Cl. 192—3.5)

This invention relates to improvements in air control systems for rotary drilling rigs, and more particularly to air control systems which utilize an air controlled master clutch, an air actuated gear shift mechanism for a transmission, and a master speed selector, with the necessary pressure controls, and elements for actuating the component parts of the system, including air compressors and air storage tanks.

Heretofore, transmission systems for rotary drilling rigs, as indicated in my prior Patents No. 2,151,881, Drilling Rig Transmission, dated March 28, 1939, and No. 2,169,780, Transmission Interlock, dated August 15, 1939, were, of necessity operated by a manually controlled master clutch so that the in-put shaft of the transmission might be rotated slowly until one jaw clutch in the transmission was disengaged and another was engaged, before applying the full power of the master clutch for driving the drilling rig.

An object of this invention is to provide for automatically engaging the master clutch so that transmission speeds may be quickly changed from one speed to another, and the master clutch so controlled as to shift these clutches without appreciable shock or jar, and so as to eliminate the breaking of chains and other parts of the drilling mechanism.

Another object of this invention is to provide an air control system in which the speed of the transmission can be selected by a speed selector element and then, by the manual operation of a single valve, the master friction clutch will be actuated to cause the transmission in-put shaft to rotate slowly until such time as the positive clutches will come into proper register to permit the engagement of the clutches, and an air cylinder or chamber will supply the necessary force to engage the clutches, at which time full air pressure will be directed to the master friction clutch to cause full engagement of that clutch for driving the transmission in-put shaft and the gearing connected thereto, to drive the drilling rig.

Another object of this invention is to provide an air control system whereby an operator can move one lever to the proper selected position, then turn on the air, and the gears or clutch will automatically try to shift into proper engagement, and the friction drive clutch will lightly engage to rotate the transmission in-put shaft slowly, in order to permit the gears or clutch to properly engage, after which the full pressure is directed to the friction drive clutch which will in turn put the full torque transmitted by the clutch to the transmission in-put shaft for driving the transmission at its rated capacity.

Another object of the invention is to provide an air control system for the drive mechanism to a rotary rig, that is simple in construction and easily set for automatic operation of the various mechanisms to be controlled.

Still another object of this invention is to provide an air control mechanism in which a clutch or gear will automatically engage, and a brake element will automatically disengage upon application of air pressure to the air control system.

Still another object of this invention is to provide an air control system by the operation of which, only one gear can be engaged at a time, thereby eliminating the hazard of simultaneously engaging more than one gear which would result in tearing up the machinery.

Yet another object of the invention is to provide an air control system in which the gears cannot be shifted while the transmission is running, or the clutch or gears cannot get out of engagement while the transmission is running.

In order to carry out these objects and others that will become apparent as the description proceeds, I have provided an air actuated clutch to control the transmission in-put shaft, a source of air with a variable pressure control valve in series with a three-way valve to turn on or off air supply, and to bleed the air from the clutch in the off position. In the clutch air line leading to the air operated clutch a diaphragm operated valve is provided and a by-pass line containing a pressure regulator is shunted around the diaphragm valve. The diaphragm valve in turn, is supplied with air by a three-way valve having off and on positions, provision being made for exhausting air from the diaphragm when the valve is in off position. This valve is connected to one of four levers on a shift shaft on which each lever is connected to a pin, one for each clutch transmission shift lock plate, one plate being provided for each clutch in the transmission, and one clutch in each plate for the engaged position of the clutch and one for the disengaged position. This shift lock shaft has a spring which tends to engage the pins in their respective notches. The air cylinder has an air connection on the rod end of the cylinder connected to a three-way valve, which valve may be operated by a governor on the transmission in-put shaft, or by other suitable means, so that when the transmission is running this valve will be closed, and the air in the cylinder will be exhausted from one port of this valve. When the transmission in-put shaft stops, this valve will open and permit air from the main supply line to press on the shift lock cylinder piston, which turns the shaft to which it is connected and pulls the pins out of their respective shift lock plate notches, and also opens a three-way valve which controls a diaphragm valve in the main clutch air supply line. This main clutch air supply line is also connected to a distributor valve which has a plurality of lines from the distributor valve to air cylinders or chambers which will shift the clutches in the transmission to disengage all the clutches except one, and engage one clutch, as selected by the operator, with the distributor valve. An air connection to the opposite side of the shift lock cylinder connects to a diaphragm operated valve which in turn connects to the main unlubricated supply line. The diaphragm chamber of this valve is connected to the line from manually controlled valve just before this line connects to the diaphragm valve in the clutch fluid supply line; and this same line connects to a brake release air chamber which disengages the brake against the action of a suitable spring.

An embodiment of this invention and a modification thereof are illustrated in the accompanying drawings, in which:

Fig. 7 is a fragmentary view of a side thereof, with parts broken away to show the details of construction; and Fig. 8 is a fragmentary side elevational view of the opposite side of the transmission from that shown in Fig. 7.

Figure 1:
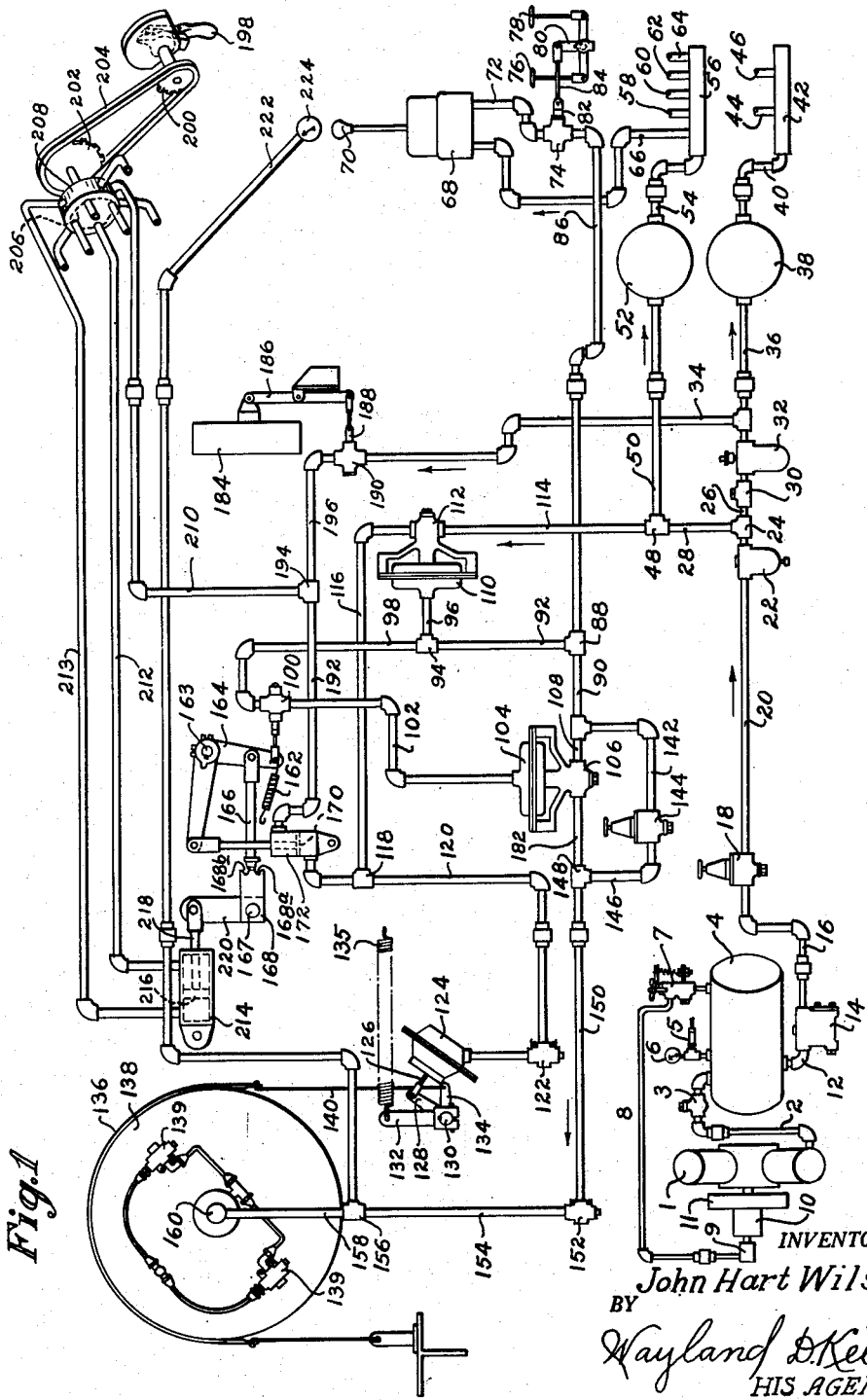
Fig. 1 is a diagrammatic view of a form of the invention, with parts broken away, and with parts shown in section and other parts omitted in order to simplify the showing.

With more detailed reference to the drawing the numeral 1 designates an air compressor driven from a motor (not shown) through a pulley 11, and which is adapted to supply compressed air through pipe 2, and check valve 3 to a storage tank 4, which storage tank is provided with a safety valve 5 and a pressure gauge 6. A pressure operated valve 7 is adapted to regulate flow of air from tank 4 through a pipe 8 to and through a rotary seal 9, and thence to an air actuated clutch 10 which engages and disengages the pulley 11 from the compressor, thereby permitting the motor to run continuously, but applying air pressure only when such pressure falls below a predetermined amount.

The main outlet from the air storage tank 4, is through a pipe 12, thence through a water separator and trap 14, through a pipe 16, and thence through a regulator 18, which regulator 18 maintains the air at a given pressure for delivery into line 20. The air which passes through the line 20 is cleansed of such foreign substances as dust particles, moisture, grit and oil, by means of a filter separator 22. The air passes through a T 24 in the line 20, one branch of which T connects to line 26 and the other to the line 28, to direct air to the various mechanisms. A check valve 30 is positioned in the line 26, intermediate the T 24 and a lubricator 32, which is of the atomizer type and furnishes lubrication for the air passing into lines 34 and 36. The air that passes into the line 36 may be directed to mechanisms of the rotary rig, such as the brakes or the drum clutches, and an auxiliary air storage tank 38 may be provided in this line, so that no material fluctuation in pressure is caused on the lines to the other air controlled mechanisms, by the use of air pressure to control the brakes of the drum clutch. The air in the auxiliary storage tank 38 feeds through a pipe 40 to a manifold 42, and thence through lines 44 and 46 which lead to the brake and drum clutches, respectively.

Air is simultaneously directed into the lines 23 and 34, and the air which passes into the line 28 passes into a T 48, thence through pipe 50 into an air storage tank 52, and through a pipe 54 into manifold 56. From the manifold 56 pipes 58, 60, 62 and 64 lead, respectively, to the throttle, cathead, pump, and rotary control. A pipe 66 leads from the manifold 56 to direct air to a variable pressure control valve 68. The air may be directed from this valve 68, by the manipulation of a control handle 70, into pipe 72 at pressures varying from zero to the maximum capacity of the system.

In the present instance, it is found desirable to have air pressure ranging from zero to 100 pounds, as delivered by regulator 18 into line 20 and to the variable control valve 68. By gradually moving the handle 70, the air is directed from valve 68 at the desired pressure into the line 72, through valve body 74, which has a sliding valve member 82 adapted to be moved to open and closed positions by means of the bell crank member 80 acting through rod 84 and actuated by the pedals 76 and 78. This valve 74 has the peculiar characteristic of being an open, closed, and exhaust valve, that is, when the valve is open, air will be directed therethrough into line 86; but when the valve 74 is closed, it will bleed the air from the line 86 and exhaust it through a port in one end of the valve body. This will prevent back pressure being built up on the line 86, to cause the improper functioning of the various valves, as will be more fully described hereinafter.

By pressing the foot pedal 78, the valve 74 is opened to direct air therethrough into line 86 and into a T 88. The air will be directed from the T 88 into lines 90 and 92, simultaneously. The air which passes into line 92 will be directed to a T 94, to pass therefrom into lines 96 and 98, simultaneously. And, with the valve 100 in the position as shown in Fig. 1, the air will be directed through line 102 into chamber 104 on top of diaphragm valve 106. This air pressure will press the diaphragm downward to close valve 106 to prevent air passing through line 108. When a predetermined low or greater air pressure is applied to line 86, the air acting through line 96 on diaphragm in chamber 110, the diaphragm connected with the valve 112 will be pressed downward opening valve 112. Upon opening the valve 112 air will be directed from pipe 20, through T 24, through pipe 28, through T 48 into pipe 114, through valve 112 which is now open, into pipe 116 and thence through T 118 into pipe 120 and through quick-release valve 122 into air chamber 124, to press a diaphragm therein to actuate a connecting rod 126 which operates bell crank 128, which, in turn, rotates shaft 130 to simultaneously rotate levers 132 and 134 which are fixed thereto. Normally the spring 135 connected to lever 132 urges crank arms 128 and 134 in a clockwise direction thus applying brake band 136 to clutch drum 138. However, when the crank 128 is moved by the air controlled diaphragm the cranks are moved against the tension of the spring 135 and crank lever 134 through connecting linkage 140 releases brake band 136 from engagement with the clutch drum 138. Thus the clutch drum 138 is free to rotate. Simultaneously with this operation, the high pressure air that is in line 90, is directed through line 142 through pressure regulator 144, which reduces the air pressure from high to low. In the present instance, it is desirable to have a high of about 100 pounds of air pressure for certain operations, and low air pressure, from 5 to 10 pounds, for other operations. The pressure regulator 144 reduces the pressure of the air to a normal low of from 5 to 10 pounds, and directs this low pressure air into line 146, thence through T 148 into line 150, thence through quick-release valve 152, into line 154 and through T 156 into line 158. Thus the air is directed into a rotary seal 160 which directs the air into a passageway in a rotating shaft. Upon the air entering the rotating shaft, the air is directed to an air tube clutch, expanding the clutch tube to cause a gripping action on the clutch, which will cause the clutch to rotate slowly. As the clutch rotates slowly, the positive jaw clutches within the transmission T (Figures 6–8) will come into register, and due to the pressure exerted by spring 162 on lever 164, mounted on shaft 163 and adapted to rock therewith, the pin 166 will be held against shift-lock plate 168 fixed on the shaft 167 which actuates the transmission jaw clutch yoke 362 (Figure 6) by the spring 162 and by the air pressure exerted on the bottom of piston 170 in cylinder 172.

As soon as the motive power which drives the clutch 138 rotates the transmission shaft to permit clutches within the transmission to come into register, the particular clutch with which the yoke 362 and the shaft 167 are associated may be engaged. When the shaft 167 is rocked under the influence of air pressure exerted on piston 170, the shift-lock plate 168 will shift. The positive clutches will engage individually under pressure exerted by one of the respective air cylinders 214, 176, 178 or 180, and in each case the pin 166 will slide into a notch 168a which will permit a shifting of lever 164 to slide valve 100 from the open position to the closed position, which is simultaneously an exhaust position for exhausting the air from line 102. Thus the pressure is relieved from chamber 104 and the diaphragm contained therein, and a spring is adapted to open the valve 106 which will direct air at full pressure through line 182 into line 150 and through quick-release valve 152, line 154, T 156, line 158, to a rotary air coupling seal 160, thence into an air tube clutch within main clutch 138, to cause full engagement of the clutch. Upon lock pin 166 engaging notch 168a in shift lock plate 168, the piston 170 moves upward to hold the pressure on lever 164 to prevent the shifting of the transmission, while the transmission is operating.

Upon the rotation of the transmission, a flyball type governor 184 will rotate therewith and will generate sufficient centrifugal force to cause the governor to push arm 186 outward, which arm is attached to a valve stem 188 to push the valve 190 inward, which will close the valve 190 and open the exhaust thereof. The air in cylinder 172 above piston 170 will pass through line 192, through T 194, and out through line 196 and through valve 190 to be exhausted to the atmosphere. With the valve 190 closed, and the air from line 196 being exhausted out through the exhaust port of the valve 190, the pressure is relieved from the top of cylinder 172 and the piston 170 therein is urged upward by pressure from line 116 to act upon the bottom of piston 170 to hold the pin 166 in engagement with notch 168a. Simultaneously, the air is exhausted from the main air supply line 210, which leads to the distributor valve 208, thereby preventing the actuation of piston 216 in the jaw clutch actuating cylinder 214 in either direction.

With the device, as now operating, the positive clutch associated with shaft 167, yoke 362, and operator selector 214 will be maintained in this position until such time as it is necessary to change the clutches to obtain different speed ratios, as the pressure is holding the pin 166 to prevent the shifting of the positive clutch. The other shift lock mechanisms are similar to those shown at 166 and 168, and with their respective cylinders 176, 178 and 180 control other positive clutches, such as intermediate, low and reverse, considering the one shown as actuated by cylinder 204 to be the high speed shift lock mechanism. With the pin 166 engaged in notch 168a of the high gear shift lock, the remaining gears will be disengaged and the respective pins of the various shift locks will be engaged in a notch comparable to the notch 168b, to hold the positive clutches out of engagement until it is desired to change to another speed.

When it is desired to start the drive with the master clutch, and no speed changes are involved, it may be desired to engage the master clutch only lightly, so as to pick up a load slowly, and in order to do this, the lever 70 of air valve 68 may be moved slightly to produce a low air pressure and then with valve 74 open, air will pass through lines 86, 92 and 96, and even a low pressure in diaphragm chamber 110 will open valve 112 and the high pressure air from line 114 will then pass through line 116, T 118, line 120, quick-release valve 122 to chamber 124 which will release the brake, as described above. Air from T 118 will be directed to the lower part of lock cylinder 172 and the air pressure is now both above and below the piston, so the spring 162 together with the pressure acting on the piston rod area in cylinder 172 will push the ends of the pins into one or the other of the notches 168a or 168b, and when this pin enters the notch, the shaft 163 will rotate moving lever 164 and opening valve 100 which admits air to diaphragm chamber 104 and closes valve 106 which permits direct flow of air through line 146 through quick-release valve 152 to clutch 138. This low air pressure can then lightly engage the clutch and the full or high air pressure will release the brake and the rig can be started or driven with the clutch partially or lightly engaged.

The lever 70 of variable pressure valve 68 is normally left in position to give full pressure. Then the bell crank 80 is caused to move the valve stem 82 into a closed position, and at the same time, simultaneously exhaust the air from line 86. Thus the pressure is relieved from the chamber 110 to permit the diaphragm therein to return under spring pressure to normal position, which closes the valve 112 and exhausts air from line 116. Upon release of pressure from line 86, a reduction of pressure within air tube clutch 138 is effected, which causes a reversal of flow of the air and with the quick-release valves 139 positioned within the clutch and a quick-release valve 152 within the air system intermediate the clutch and the control valve 74, the reduction of pressure on the in-put side of the clutch will cause an opening of these release valves to dump the air and permit a quick release of the clutch 138. Simultaneously with the release of air on diaphragm 110, the valve 112 will close and automatically exhaust the air from line 116, which will cause a dumping action of quick-release valve 122, which will, in turn, release pressure from diaphragm chamber 124, and permit the connecting rod 126, under pressure of spring 135, to move the diaphragm back to its normal position. In so doing, the spring 135 is sufficiently strong to rotate shaft 130 and rotating lever 134 which is fixed thereto, thereby drawing connecting link 140 downward to engage brake band 136 to stop the clutch 138.

When the clutch 138 ceases to rotate, the flyball governor 184 will cause arm 186 to move inward, which will, in turn, move valve stem 188 outward to open valve 190, thereby directing air through line 34 and line 196 and line 192 to the top of cylinder 172 so as to move piston 170 downward, thereby rotating shaft 163 to move the lever 164 to withdraw the pin 166 from the notch 168a. In so doing, the pin 166 is withdrawn, as are the corresponding pins in the other positive clutch shift mechanisms. The speed selector handle 198 may be moved to the desired position before the air is released from line 86. Upon moving the speed selector handle 198 the sprocket 200, positioned on the shaft at the inner end thereof, will move sprocket 202 by means of a chain 204, so that the desired speed may be selected by the speed selector, after which, and in co-ordinated relation, the speed change will be automatically accomplished. Thus a rotary valve member 206, within speed selector valve 208, will move certain ports into register so as to direct air from line 210, through valve 208 into line 212 (for example), leading to an air cylinder 214, to move piston 216 which is connected thereto by connecting rod 218, to shift lever 220. Then a pull is exerted on lever 220 in an effort to rotate shaft 167, to move the shift lock plate to the desired notch; however, this function is performed simultaneously with other air control actions, as will be more fully described hereinafter.

The speed selector lever 198 can be manipulated with or without air pressure on the valve 208, therefore, the ports within the valve to direct air to the cylinder 214 and other operating cylinders are merely placed in selected arrangement for automatically functioning to shift the clutches into the proper speed, or the particular speed selected, when the air is directed to the system.

When air is applied to the system, by pressing the clutch pedal 78 to open valve 74, air is directed into lines 86, 92 and 90, simultaneously, and the cycle as above described will be repeated, and with the pressure acting upon piston 216 through line 212, the tendency to shift the lever 220 and shift lock plate 168 into gear will cause shift lock plate 168 to rotate until notch 168a is in register with pin 166, which will cause the pin 166 to drop into the notch 168a, and the cycle will be repeated.

Any particular positive clutch for the desired speed may be selected and all the remaining clutches will be restrained from movement by a pin which is the equivalent of the pin 166, being engaged in a notch equivalent to the notch 168b, therefore, only one positive clutch can be engaged at one time. A line 222 may lead from T 156 to air gauge 224, so as to determine the amount of air pressure upon the tube of the clutch 138.

It is desirable to have some of the air, after it has passed through the filter, lubricated as by means of the lubricator 32, and other air to be unlubricated, because of the particular use to which each type of air is to be adapted. It is preferable to have the lubricated air directed through line 34, so as to act upon the top of piston 170 to lubricate the piston within the cylinder. It is also preferable to direct lubricated air through line 210 into distributor valve 208 and through line 212 or 213 into cylinder 214, so as to properly lubricate the piston within the cylinder.

The unlubricated air is preferably used to act upon the diaphragms, and to pass through valves to which oil might be injurious, therefore, it is desirable to have the air passing through lines 114, 116, and 120 free of lubrication, or as nearly so as possible.

Figure 2:
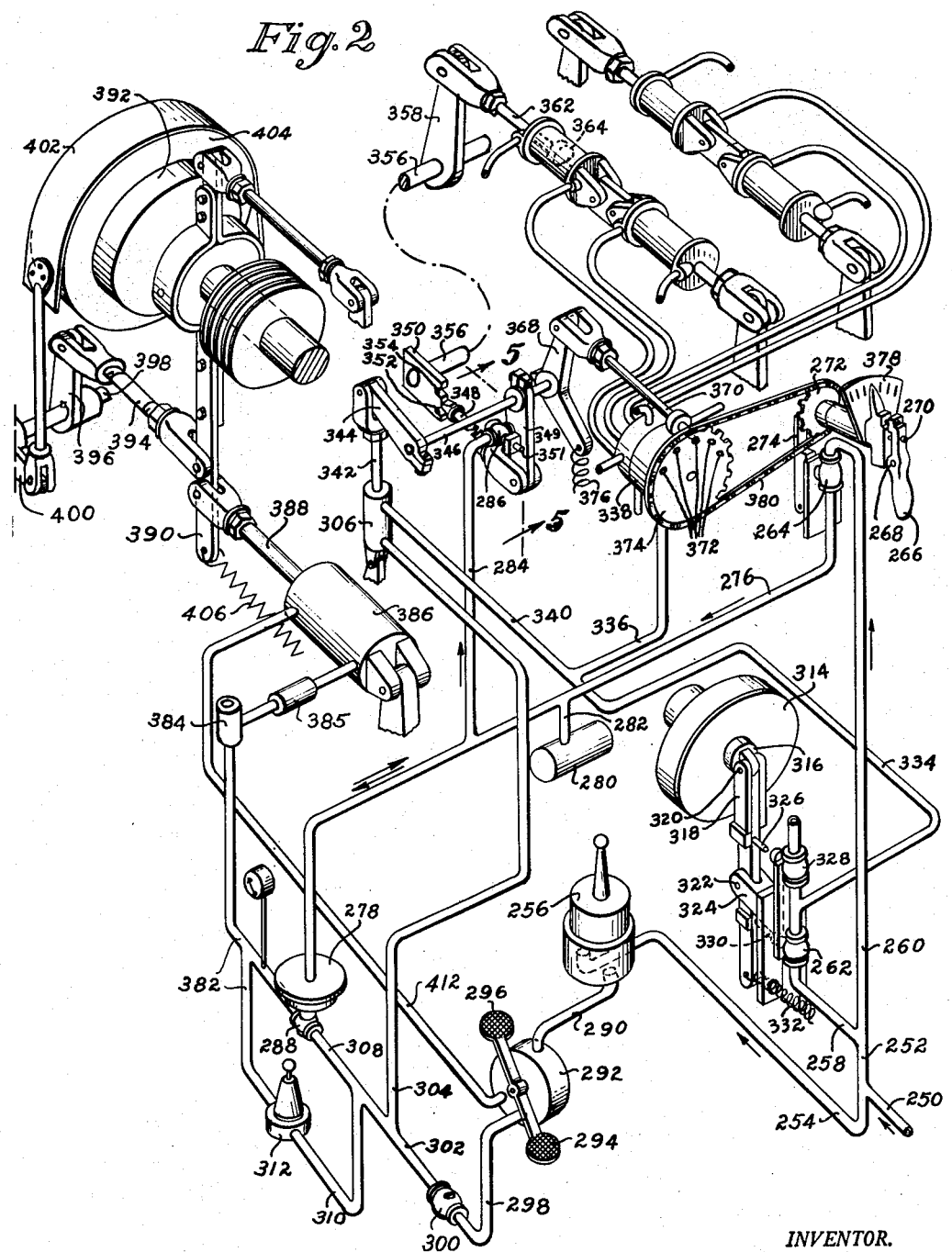
Fig. 2 is a perspective, diagrammatic view of one embodiment of the invention, with certain parts broken away, and with certain parts omitted to simplify the showing.
Figure 3:
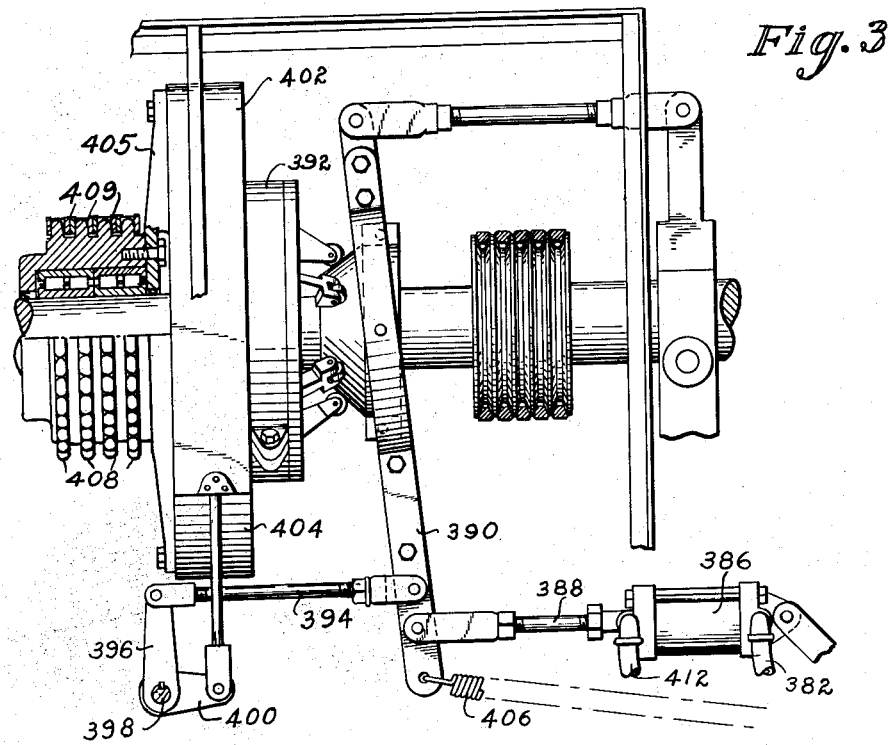
Fig. 3 is a detail view of one form of air operated master friction clutch.
Figure 4:
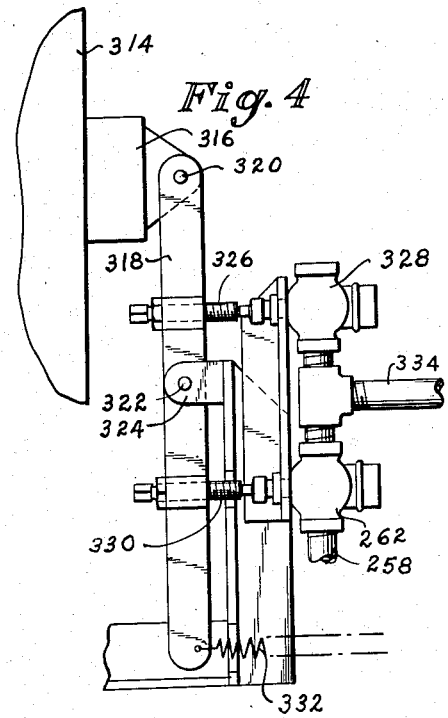
Fig. 4 is an enlarged fragmentary view of the valve system operated by the governor, a fragmentary part of which governor is shown.
Figure 5:
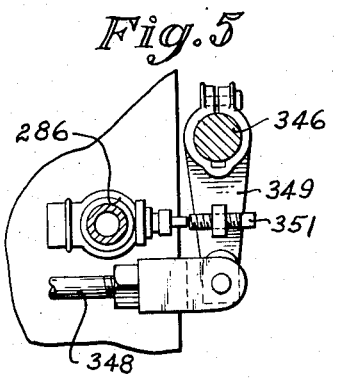
Fig. 5 is a sectional view taken on the line 5—5 of Fig. 2.

The form of the invention as shown in perspective diagrammatically in Fig. 2, performs substantially the same general functions as the form of the invention as described above, except, the mechanical power for operating the friction clutch is applied to the clutch mechanisms by an air actuated piston within a cylinder.

The air generating system for use in connection with the form of the invention as shown in Fig. 2 is substantially like the system shown for Fig. 1, elements 1 to 22, inclusive. The pipe 250, as shown in Fig. 2 is comparable to the pipe 20 shown in Fig. 1, which pipe is connected to a suitable air pressure generating system, as shown in Fig. 1, and which air may be cleansed and lubricated as described in connection with the form of the invention as illustrated in Fig. 1. The air is directed from pipe 250 into pipe 252 and the pipe 254 simultaneously. The pipe 254 is connected to a variable pressure control valve 256 which will be described more completely hereinafter.

The air passing through pipe 258 is controlled by a valve 262, as will be more fully described hereinafter. The air passing through pipe 260 in the direction indicated by the arrow, passes to and through valve 264, which valve is controlled by the speed selector handle 266. The handle 266 is pivoted at 268 so as to actuate pin 270 in the shaft of sprocket 272 so as to operate a rocker arm 274, which rocker arm is attached to the valve stem of distributor valve 264, so that upon the lower end of the handle being pressed inward, the rocker arm 274 is drawn toward valve 264 so as to open the valve as desired to direct air into line 276. The air is directed through line 276 to the top of diaphragm 278 with the back pressure therefore building up a reserve supply of air under pressure in tank 280 connected to line 276 through pipe 282. The air is also directed from line 276 into line 284 and to relief valve 286, the function of which will be more fully described hereinafter. This air is high pressure air and is directed into a diaphragm in chamber 278 to close the valve 288, as will be more fully described hereinafter.

The air is directed from variable pressure control valve 256 into line 290 and into foot controlled valve 292 which is operable by pedals 294 and 296. Upon depressing the foot pedal 294 the valve ports within valve 292 are switched to direct air into line 298 through quick-release valve 300 and into line 302. From this line the air is directed simultaneously into pipe 304 leading to cylinder 306 and into pipe 308 leading to valve 288 and through pipe 310 leading to pressure regulator 312.

With the transmission running, the governor 314, which is connected in driving relation therewith, and the governor element which is connected with longitudinally movable axial element 316, which element is so connected to the governor so as to be moved outward when the governor is running above a predetermined speed and to be moved inward when the governor runs below a predetermined speed. An arm 318 is pivotally connected at 320 to the element 316 and the arm is also fulcrumed at 322 to bracket 324, so that upon outward movement of axial element 316 the upper end of the arm will be pushed outward. Plunger 326 is adapted to engage the stem of air release valve 328 to open valve 328, and upon the inward movement of element 316 the plunger 326 disengages valve stem 328 to close the valve. Upon further inward movement of element 318, the plunger 330 is adapted to engage the stem to depress same to open the valve 262 under the influence of the tension of spring 332, one end of which spring is attached to the arm 318.

Figure 6:
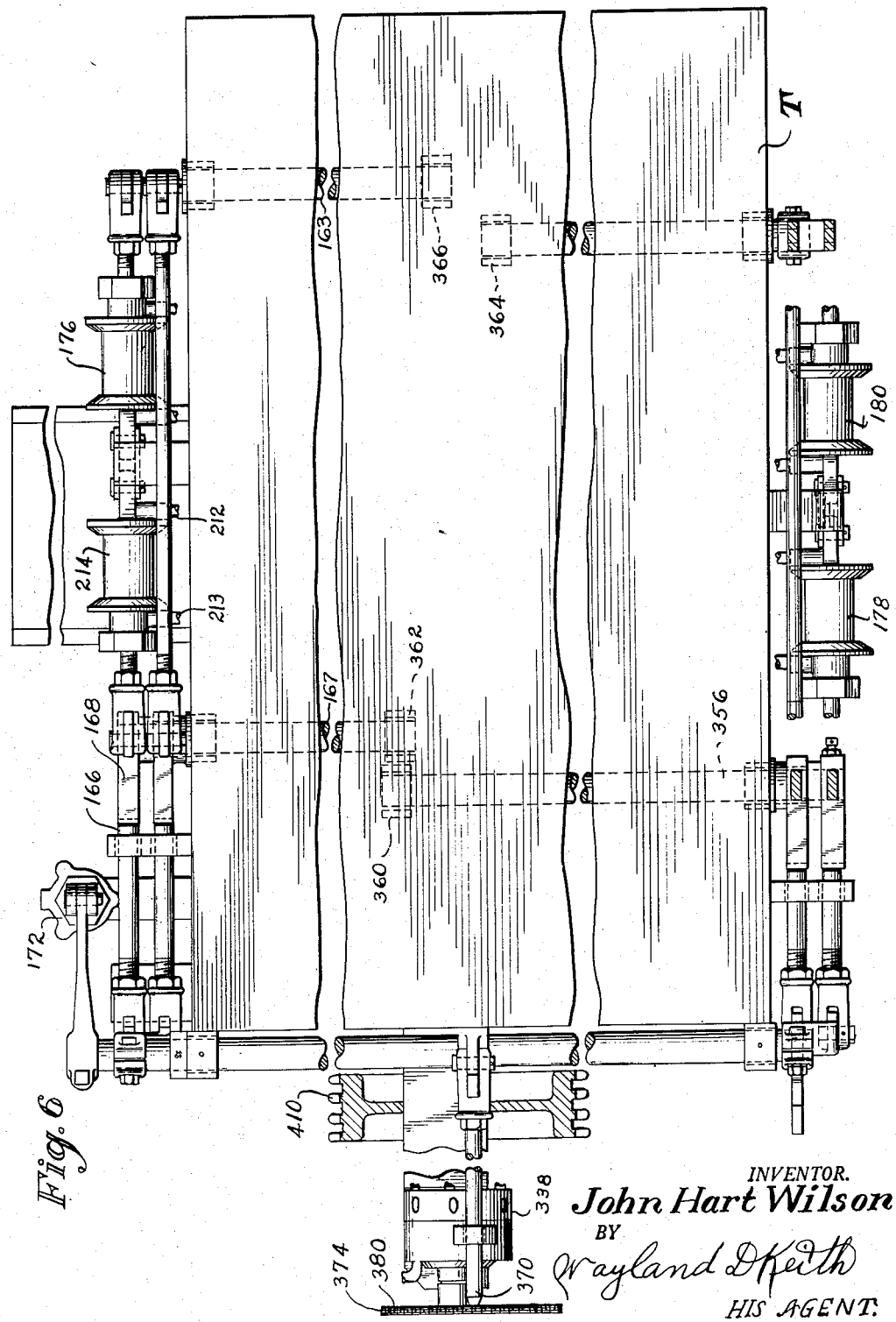
Fig. 6 is a top plan view of a pneumatically operated speed transmission, with parts broken away and shortened to show the details of construction.

With the valve 262 open and the valve 328 closed, high pressure air will be directed through line 334 simultaneously to lines 336 and 340 leading respectively to variable speed selector valve 338 and to the top of cylinder 306. The air will only be directed through the line 334 when the governor is stopped or is running very slowly below a predetermined speed, which is usually about forty R. P. M. With the air acting upon the top of the piston within cylinder 306, the connecting rod 342 will exert a downward force on lever 344 to rotate shaft 346 to disengage shift lock pin 348, so as to enable the selection of the proper speed of the transmission, while the clutch elements in the transmission are rotated at a very slow speed. The shift lock plate 350 has notches 352 and 354 in a side thereof, which notches are adapted to be engaged by shift lock pin 348, as will be more fully described hereinafter. One shift lock plate is provided for each speed desired. In the present instance, only one shift lock plate is shown; however, four operating cylinders are shown, and for which four shift lock plates are provided and operatively connected, as shown in Figs. 6 to 8, inclusive. However, for diagrammatic illustration, only one shift lock plate is shown in Fig. 2, which shift lock plate is connected to a shaft 356 that is secured to arm 358. A clutch operating yoke 360 is secured to the shaft 356 so that upon rotation of shaft 356 through an operating arc, by movement of piston 178, the particular jaw clutch within the transmission is shifted for engaging the gearing element for the proper speed, as will be more fully described hereinafter.

Upon the rotation of the shaft 346, a bell crank 368 will be rotated to withdraw index pin 370 from index hole 372 in sprocket 374, and in so doing a tension is exerted on spring 376; however, with the index pin 370 withdrawn from engagement with sprocket 374, the sprocket 374 may be rotated by rocking speed selector handle 266 to the proper position on dial 378, which will cause sprocket 272 to rotate sprocket 374 through chain 380. When the proper selected speed is reached and with the foot pedal 294 depressed and with air on lines 308 and 310, and with valve 288 closed, high pressure air will be directed through pressure regulator 312, where the pressure is reduced to a fraction of its previous pressure on line 308. It is preferable to use approximately 100 pounds air pressure on the line 250 leading into the system, and for the pressure regulator 312 to be adapted to reduce the pressure to approximately five to ten pounds, which low pressure air is directed outward through line 382 through quick-release valve 384 and check and metering valve 385 then into cylinder 386 which will push piston rod 388 forward to actuate yoke 390 to cause the engagement of a clutch 392, which clutch may be of the friction element type, such as friction plates, cones, blocks or the like. Simultaneously with the engagement of the clutch 392, the clutch yoke lever 390 operates a linkage 394 connected with a lever 396, which rotates shaft 398 to move lever 400 upward so as to release brake band 402, which brake band is positioned around the outer periphery of brake element 404 which is made integral with clutch 392.

In moving the clutch yoke 390 inward to engage the clutch 392 and to disengage brake 402, the lever 390 is pushed against the tension of spring 406 which stores up a mechanical energy in the form of spring tension to operate brake 402 when the clutch is disengaged.

Upon the engagement of the clutch, and with the air coming through pressure regulator 312, the clutch is only lightly engaged and will rotate slowly so as to drive pulley 408 to rotate pulley 410 positioned on transmission T, which in turn will rotate gearing elements to permit the complementary clutch members to come into proper register.

Upon the direction of air through line 392, the air is also directed through pipe 304 into the lower end of cylinder 306 which balances the air pressure exerted on top of the piston in cylinder 306 plus the difference in the area of the piston rod 342 within cylinder 306. With this added advantage plus the tension of the mechanical energy stored in spring 376, the lock pin 348 will be urged against shift lock plate 350, if the clutches are not in register the pin will be forced against the end of plate 350, and when the jaw clutches do come into proper register, the engagement of the clutches will cause a shifting of the plate 350 so the pin will engage one of the notches 352 or 354, one of these notches being for the engaged position of the clutch and the other for the disengaged position.

The speed selector valve 338 is so arranged as to supply air to only one cylinder, such as cylinder 178, at a time. After the clutch has come into register and engaged fully, and the shift lock plate has shifted to permit the engagement of lock pin 348, the lever 349 will cause plunger 351 to engage the stem of valve 286, which will release the air from lines 284 and 276, and with valve 264 closed, the pressure on diaphragm 278 will return to atmosphere, which will permit the opening of valve 288 which will permit the air to flow through lines 208 and through quick-release valve 384, and check and metering valve 385 into the end of cylinder 386, and since this is high pressure air acting upon the piston within cylinder 386, considerable force will be transmitted to the clutch yoke 390 to fully engage the clutch 392. With the clutch fully engaged, the full drive torque of an engine may be transmitted through the clutch 392, to drive ring 404, drive flange 405, drive sprocket 408 and chain 409 to transmission sprocket 410. When it is desired to shift a transmission clutch to another speed, the foot pedal 296 is depressed, which will open a port to cause air to exhaust from valve 292 to bleed air from lines 382, 308, 302 and 298, and at the same time direct air from line 290 through line 412 into the piston rod end of cylinder 386. This will withdraw the piston rod 388, and cause yoke 390 to disengage clutch 392 and simultaneously apply brake 402 under tension of spring 406. The quick-release valves 300 and 385 are of the type that when there is a reversal of the flow of air, the valve will exhaust therethrough. After the air has been bled from lines 298, 302, 308, and 382, and with the clutch 392 disengaged and with air bled from line 304, piston rod 342 will move downward to simultaneously disengage lock pin 348 and index pin 370 from lock plate 372 and sprocket 374 so as to permit the rotation of sprocket 374 by manipulation of gear selector handle 266, as hereinbefore described.

It can be readily appreciated that the regulator valve 312 can be set to give the correct pressure on cylinder 386 to rotate the clutch 392 slowly until the clutches within the transmission are completely engaged. After these are in register, the selected cylinder 178 automatically shifts the clutch into place without manual attention on the part of the operator. Once the clutch is shifted into place, the air is bled from the line 336 leading to the speed selector valve 338, so as to prevent the shifting of gears while the transmission is in operation. The spring 376 holds lock pin 348 engaged in the proper notch for the selected speed of the particular clutch and the other three shift plates have their respective lock pins positioned within the disengaged notch. The respective cylinders are operated by the speed selector valve 338 independently and automatically only after the selector valve handle 266 is positioned in the proper place and the air directed to the clutch 292 in the manner as hereinbefore described.

Having thus described the invention, I claim:

1. In a drilling rig transmission shift system comprising a transmission assembly having an in-put shaft and an out-put shaft, a pressure fluid system, a fluid actuated main clutch to drive the transmission in-put shaft, a source of fluid pressure supply, a variable pressure control valve in said system in series with a three-way valve to turn on and off the fluid supply and to bleed the fluid from the clutch in the off position, a diaphragm operated valve in the system connected in parallel with a by-pass conduit containing a variable pressure regulator set at low pressure, the diaphragm valve in turn being supplied with fluid by a second three-way valve in the system and having off and on positions and exhausting fluid from the diaphragm in the off position, change speed clutches in said transmission assembly, a shift shaft in the assembly connected with each of said clutches, and a shift lock plate operatively connected with each shift shaft to swing through an arc as said shaft rocks, a shift lock shaft pivoted in said assembly adjacent said shift lock plates, said shift lock shaft having fixed thereto levers each carrying a shift lock pin, notches in each shift lock plate to receive the associated shift lock pin, there being one notch in each plate for reception of the pin during engaged position of the corresponding transmission clutch and one for the disengaged position thereof, a spring for urging said pins toward the notches in the lock plates, a shift lock fluid cylinder containing a piston and a piston rod extending through one end thereof, said fluid cylinder having a fluid connection adjacent the rod end thereof with a third three-way valve, means responsive to the speed of the transmission for actuating said third three-way valve so that when the transmission is running this valve will be closed and the fluid in the cylinder will be exhausted from one port of this valve, but when the transmission in-put shaft stops, said valve will open and permit fluid from the main supply conduit to actuate the shift lock cylinder piston, which turns the shaft to which it is connected and pulls out the pins from the shift lock plate notches, which also opens the second named three-way valve which controls said diaphragm valve in the main clutch fluid supply conduit, the fluid supply system being connected to a selector valve which has a plurality of conduits leading therefrom to fluid actuated power elements which will shift the clutches in the transmission to disengage all clutches except one, and engage one clutch as selected by the operator by means of said selector valve, a brake for the main clutch, a fluid actuated brake release element, a spring urging said brake toward applied position, and a fluid connection from the opposite side of the shift lock cylinder to a conduit connecting to the brake release fluid actuated element which disengages the brake against the action of said spring.

2. In a drilling rig transmission shift system comprising a transmission assembly having an in-put shaft and an out-put shaft, a pressure fluid system, a fluid actuated main clutch to drive the transmission in-put shaft, a source of fluid pressure supply, a variable pressure control valve in said system in series with a three way valve to turn on and off the fluid supply and bleed the fluid from the clutch in the off position, a diaphragm operated valve in the system connected in parallel with a by-pass conduit containing a variable pressure regulator set to a low pressure, the diaphragm valve in turn being supplied by fluid by a second three way valve in the system and having on and off positions and exhausting fluid from the diaphragm in the off position, change speed clutches in said transmission assembly, a shift shaft in the assembly connected with each of said clutches, and a shift lock plate operatively connected with each shift shaft to swing through an arc as said shaft rocks, a shift lock shaft pivoted in said assembly adjacent said shift lock plates, said shift lock shaft having fixed thereto levers each carrying a shift lock pin, notches in each shift lock plate to receive the associated shift lock pin, there being one notch in each plate for reception of the pin during engaged position of the corresponding transmission clutch and one for the disengaged position thereof, a spring for urging said pins toward the notches in the lock plates, a shift lock fluid cylinder containing a piston and a piston rod extending through one end thereof, said fluid cylinder having a fluid connection adjacent the rod end thereof with a third three-way valve, means responsive to the speed of the transmission for actuating said third three-way valve so that when the transmission is running this valve will be closed and the fluid in the cylinder will be exhausted from one port of this valve, but when the transmission in-put shaft stops, said valve will open and permit fluid from the main supply conduit to actuate the shift lock cylinder piston, which turns the shaft to which it is connected and pulls out the pins from the shift lock plate notches, which also opens said second three way valve which controls said diaphragm valve in the main clutch fluid supply conduit, the fluid supply system being connected to a selector valve which has a plurality of conduits leading therefrom to fluid actuated power elements which will shift the clutches in the transmission to disengage all clutches except one, and engage one clutch as selected by the operator by means of said selector valve, a brake for the main clutch, a fluid actuated brake release element, a spring urging said brake toward applied position, and a fluid connection from the opposite side of the shift lock cylinder connecting to a second diaphragm operated valve, the diaphragm of which is connected to the fluid actuated clutch just before it reaches the first named diaphragm valve with the bypass line containing the regulator, the second named diaphragm valve in turn being connected to a source of air supply on one side and on the other side to the lock cylinder and the brake release fluid chamber, and means for exhausting the air from the brake fluid chamber and lock cylinder when the said second named diaphragm valve is closed.

3. A speed selector control for a change speed transmission having interengageable sets of driving and driven elements, an air tube fluid actuated main driving clutch for operating said transmission from a source of power, said main clutch having a driving member and a driven member, a fluid pressure supply, fluid pressure lines from said supply communicating with said clutch, means for directing fluid pressure through said lines to said main clutch to actuate it, a diaphragm pressure reducing means in said lines for reducing the pressure supply to said main clutch and thus reduce the speed and torque of the transmission, means for selectively engaging the driving and driven elements of the change speed transmission, means operatively controlled by said transmission elements and adapted to control the functioning of said pressure reducing means, whereby during disengaged relation of said transmission elements reduced pressure is supplied to the main clutch for slow operation of said transmission during engagement of the transmission elements, and whereby engagement of the elements automatically supplies fluid at increased pressure to the clutch for normal driving.

4. A speed selector control for a change speed transmission having a plurality of positively interengageable sets of driving and driven elements, a fluid actuated main driving clutch for operating said transmission from a source of power, said main clutch having a driving member and a driven member, a fluid pressure supply, fluid pressure lines from said supply communicating with said clutch, means for directing fluid pressure through said lines to said main clutch to actuate it, a by-pass in said lines and a pressure reducing means in said by-pass, a valve controlling flow alternatively directly to said clutch or through said pressure reducing by-pass, fluid pressure actuated means for selectively engaging the driving and driven elements of the change speed transmission, means operatively controlled by the position of said transmission elements and adapted to actuate said by-pass controlling valve to bring said pressure reducing means into and out of operation, whereby during disengaged relation of said transmission elements reduced pressure is supplied to the main clutch for slow operation of said transmission during engagement of the transmission elements, and whereby engagement of the elements automatically supplies fluid at increased pressure to the clutch for normal driving.

5. A speed selector control for a change speed transmission having selectively and positively interengageable sets of driving and driven elements, fluid pressure cylinder-and-piston motors for actuating each of said selectively interengageable driving and driven elements, a manually operated selector valve settable to supply fluid pressure to said motors to actuate one of said sets of elements to interengage, and to actuate all of the other sets of elements to disengage, a fluid actuated main driving clutch for operating said transmission from a source of power, said main clutch having a driving member and a driven member, a fluid pressure supply, fluid pressure lines from said supply communicating with said clutch, means for directing fluid pressure through said lines to said main clutch to actuate it, a pressure reducing means in said lines for reducing the pressure supply to said main clutch and thus reduce the speed and torque of the transmission, means for supplying fluid pressure to said selector valve to actuate the motors, means operatively controlled by said transmission elements and adapted to control the functioning of said pressure reducing means, whereby during disengaged relation of said transmission elements reduced pressure is supplied to the main clutch for slow operation of said transmission during engagement of the transmission elements, and whereby engagement of the elements automatically supplies fluid at increased pressure to the clutch for normal driving, and means controlled by the speed of the transmission for cutting off the fluid supply to the selector valve so that the transmission cannot be shifted during running.

6. The selector control as set forth in claim 5 in which fluid pressure actuated transmission element locking means are provided, and means are also provided to operatively connect the said speed controlled means therewith to insure that the selected transmission elements are locked in position during running.

7. A speed selector control for a change speed transmission having a plurality of sets of positively interengageable driving and driven elements, a fluid actuated main driving clutch for operating said transmission from a source of power, said main clutch having a driving member and a driven member, a fluid pressure supply, fluid pressure lines leading from said supply to said clutch and to said transmission, means in said line to vary the pressure of the fluid supplied to said clutch, fluid pressure actuated means for selectively engaging the driving and driven elements of the change speed transmission, means for locking the elements of the transmission in selected positions so that only one of those elements may be engaged at a time, means actuated by said locking means for actuating said fluid varying means associated with the clutch, whereby low torque is transmitted through the clutch to the transmission when the transmission elements are not engaged and high torque transmitted after completion of the engagement and operation of the locking means.

8. The speed selector control as set forth in claim 7 in which there is provided for each of the sets of interengaging driving and driven elements of the transmission a rockable shift shaft adapted to be selectively actuated for operating said elements, a lock plate carried by each of said shafts having notches therein, a lever pivotally mounted adjacent said transmission elements and carrying a lock pin adapted to engage in the notches of a lock plate to lock the plates and the shift shaft and thus the transmission element associated therewith, whereby but one set of driving and driven elements of the transmission may be engaged at a time, one of said notches being adapted to be engaged by the associated lock pin to hold the transmission elements in interengaging relation and another of said notches being adapted to be engaged by the lock pin so as to hold said driving elements out of engagement, and the means controlling the pressure of the fluid supplied to the clutch including mechanism operatively connected with said lock levers.

9. A speed selector control for a transmission assembly having an input shaft and a plurality of sets of positively interengageable speed change elements, a fluid-actuated main clutch controlling the rotation of said input shaft, means for selectively directing fluid at different pressures to said clutch to effect a variation in the engagement thereof to vary the torque transmitted, means for effecting engagement and locking of a selected set of speed change elements in the transmission, said last named means including a shift shaft for each of speed change elements positioned in the transmission assembly and rotatable to shift said elements, a lock plate having notches therein connected with each shift shaft to rotate therewith, fluid pressure means for actuating said shift shafts and a selector valve associated with the transmission for selectively distributing pressure fluid to said shift shaft actuating means, a shift lock shaft in said transmission assembly, a shift lock fluid pressure cylinder for rotating said shift lock shaft through an arc, spring means for urging said shift lock shaft in one of its directions of movement, levers carried by said shift lock shaft and having lock pins each associated with one of the lock plates and adapted to enter one of the notches therein so as to lock the shift shafts to hold the respective sets of transmission elements in and out of proper engagement, means for cutting off the fluid supply to said shift lock cylinder and to said selector valve when said transmission input shaft is rotating at a speed above a predetermined rate, and for opening fluid supply to said lock cylinder and said selector valve when said input shaft rotates at a speed below said predetermined rate, and fluid pressure means operatively controlled by said transmission element engaging and locking means for operating said main clutch fluid directing means to increase the delivered torque of the clutch only after engagement of the selected set of transmission elements.

10. A speed selector control for a transmission assembly having an input shaft and a plurality of sets of positively interengageable speed change elements, a fluid-actuated main clutch controlling the rotation of said input shaft, means for selectively directing fluid at different pressures to said clutch to effect a variation in the engagement thereof to vary the torque transmitted, means for effecting engagement and locking of a selected set of speed change elements in the transmission, said last named means including a shift shaft for each set of speed change elements positioned in the transmission assembly and rotatable to shift said elements, a lock plate having notches therein connected with each shift shaft to rotate therewith, fluid pressure means for actuating said shift shafts and a selector valve associated with the transmission for selectively distributing pressure fluid to said shift shaft actuating means, a shift lock shaft in said transmission assembly, a shift lock fluid pressure cylinder for rotating said shift lock shaft through an arc, spring means for urging said shift lock shaft in one of its directions of movement, levers carried by said shift lock shaft and having lock pins each associated with one of the lock plates and adapted to enter one of the notches therein so as to lock the shift shafts to hold the respective sets of transmission elements in and out of proper engagement, the aforesaid means for selectively directing fluid to said main clutch including the following means, a low pressure line to the clutch, a high pressure by-pass to the clutch, a diaphragm-actuated valve controlling said by-pass, a control valve adapted to be opened by movement of said shift lock lever to element-engaging position to supply pressure fluid to said diaphragm to close the diaphragm valve to cut off high pressure fluid to the clutch, movement of the shift lock shaft in the element-disengaged direction serving to move said control valve to exhaust position to relieve pressure on the diaphragm and cut off the high pressure supply to the clutch, whereby the low pressure supply causes the clutch to operate at low speed and torque for facilitating selection and engagement of the transmission elements.

11. A speed selector control for a change speed transmission having selective sets of positively engageable driving and driven elements, an air tube fluid actuated main clutch for operating said transmission from a source of power, a driving member and a driven member in said clutch, an actuating element for said clutch, diaphragm pressure reducing means for supplying pressure fluid to said actuating element at alternative high and low pressures to rotate the driven element of the clutch and the transmission at high and low speeds, means operatively connected with said transmission elements to cause said first named means to supply low pressure fluid to said clutch actuating element until said elements are shifted into their selected engagement and to automatically supply high pressure fluid to said clutch actuating element to cause increased driving torque upon engagement of said elements.

12. A speed selector control for a change speed transmission having selective sets of positively engageable driving and driven elements, a fluid actuated main clutch for operating said transmission from a source of power, a driving member and a driven member in said clutch, an actuating element for said clutch, a conduit leading from a source of pressure fluid, a fluid pressure reducer in said conduit for supplying pressure fluid to said actuating element at alternate high and low pressures to rotate the driven elements of the clutch and the transmission at high and low speeds, a by-pass conduit around said pressure reducer, a diaphragm actuated valve in said by-pass conduit, a fluid pressure line connected with said diaphragm in said line, an operative connection between said last mentioned valve and said transmission elements and adapted to actuate the valve to cause the diaphragm valve to close the by-pass and supply low pressure fluid to the clutch to rotate the clutch slowly until the transmission elements are engaged and to actuate the diaphragm valve to open said by-pass to automatically supply high pressure fluid to said clutch actuating element to cause increased driving torque when the transmission elements are positively engaged.

13. The speed selector control as set forth in claim 12 in which there is further provided a manually actuated valve in said fluid pressure conduit in advance of said by-pass and pressure reducer for varying the pressure of the fluid supplied to the clutch actuator at will.

References Cited in the file of this patent

UNITED STATES PATENTS

| Number | Name | Date |
|---|---|---|
| 1,883,743 | Maybach | Oct. 18, 1932 |
| 1,903,635 | Saives | Apr. 11, 1933 |
| 2,086,501 | Hill | July 6, 1937 |
| 2,159,170 | Maybach | May 23, 1939 |
| 2,169,780 | Wilson | Aug. 15, 1939 |
| 2,251,445 | Fawick | Aug. 5, 1941 |
| 2,280,329 | White | Apr. 21, 1942 |
| 2,328,090 | Nutt | Aug. 31, 1943 |
| 2,328,092 | Nutt | Aug. 31, 1943 |
| 2,450,161 | Price | Sept. 28, 1948 |
| 2,461,218 | Lopsley | Feb. 8, 1949 |
| 2,467,829 | Hornbostel | Apr. 19, 1949 |

FOREIGN PATENTS

| Number | Country | Date |
|---|---|---|
| 763,846 | France | Sept. 28, 1948 |